United States Patent [19]

Raabe et al.

[11] 4,155,794

[45] May 22, 1979

[54] PLASTIC CONTAINER

[75] Inventors: Erwin M. Raabe, Westfield; Jack M. Kamins, Matawan; Benjamin F. Cake, Westfield, all of N.J.; Albert F. Gerlovich, Danville; William A. Conrad, Pinole, both of Calif.; George E. Trieschock, Plainfield, N.J.; Morris M. Knepp, Framingham; Lee R. Layman, Wayland, both of Mass.; Eugene E. Stark, Milltown, N.J.

[73] Assignee: Rheem Manufacturing Company, New York, N.Y.

[21] Appl. No.: 895,129

[22] Filed: Apr. 10, 1978

Related U.S. Application Data

[60] Division of Ser. No. 629,061, Nov. 11, 1975, abandoned, and a continuation of Ser. No. 831,663, Sep. 8, 1977, abandoned.

[51] Int. Cl.² .................. B29C 27/00; B32B 19/02; H05B 5/00
[52] U.S. Cl. ........................ 156/380; 156/69; 219/10.53; 219/10.57; 219/10.79
[58] Field of Search .................. 156/380, 69, 272; 219/10.53, 10.57, 10.81, 10.79

[56] References Cited

U.S. PATENT DOCUMENTS

| 3,460,310 | 8/1969 | Adcock et al. ......................... 156/69 |
| 3,549,440 | 12/1970 | Adcock et al. ......................... 156/69 |

FOREIGN PATENT DOCUMENTS

| 732529 | 3/1943 | Fed. Rep. of Germany ............. 156/69 |
| 1008560 | 5/1957 | Fed. Rep. of Germany ............ 156/583 |

Primary Examiner—Douglas J. Drummond
Attorney, Agent, or Firm—Watson, Leavenworth, Kelton & Taggart

[57] ABSTRACT

Plastic containers include a shell an open end of which is sealably closed by a closure member having a peripheral hinge portion secured to the shell and an inner expanse which may be bowed axially of the shell. The closure member is unfolding or deformable in drop testing such that sealable closure of the shell is maintained.

4 Claims, 9 Drawing Figures

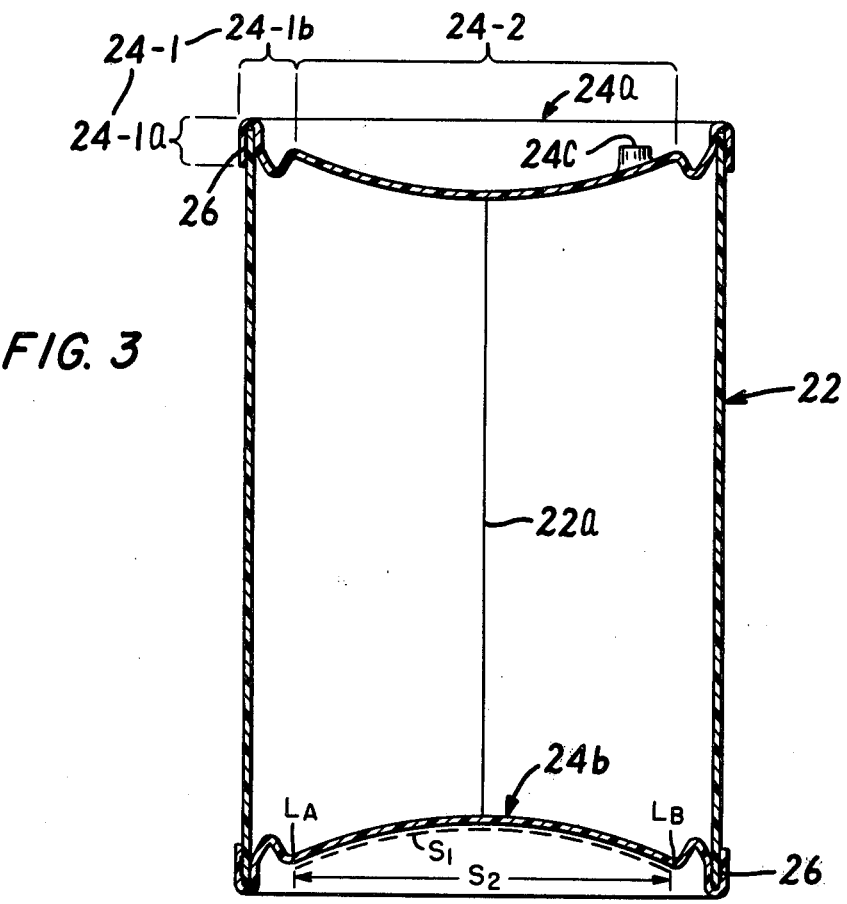
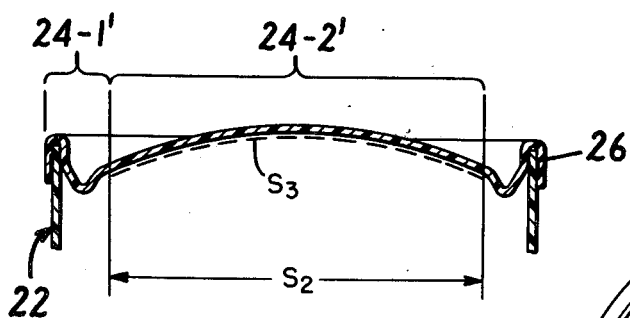
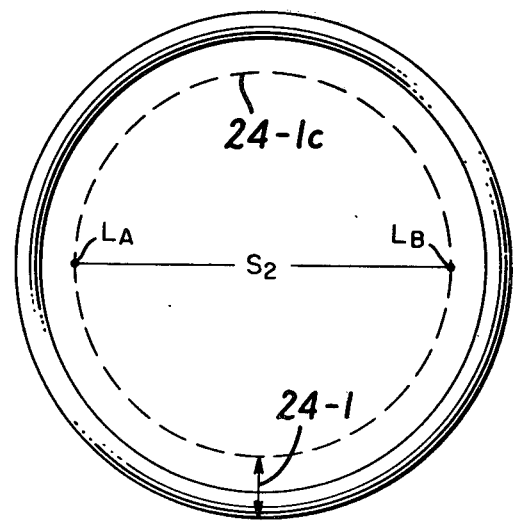
FIG. 3
FIG. 3a
FIG. 4

PLASTIC CONTAINER

This is a continuation of application Ser. No. 831,663, filed Sept. 8, 1977, now abandoned and divisional of Ser. No. 629,061 filed Nov. 11, 1975, now abandoned.

FIELD OF THE INVENTION

This invention relates to containers for the storage and shipping of materials and to methods for container manufacture.

BACKGROUND OF THE INVENTION

In its efforts to economize in container manufacture while yet seeking to meet the demand of drop tests and like performance standards and to lessen container static weight and hence transportation costs, the container industry has looked extensively to the use of non-metals. In industrial shipping containers, efforts to eliminate or lessen metal usage have taken widely diverse directions. In Carpenter U.S. Pat. No. 3,357,626 a drum is disclosed having body or shell formed by winding laminated layers of fiberboard into an open-ended cylinder which is then sealed. With the shell placed in a press, a plastic parison is extruded inside the shell and beyond the ends thereof. Upon closure of the press, bottom and top portions of the parison are closed and the parison is blown to conform to the form defined by the shell and the bottom and top die faces of the press. End covers are secured to the lined fibrous shell by use of metal reinforcing chimes. Other forms of such plasticlined fibrous shell containers made in similar manner are shown in Carpenter U.S. Pat. Nos. 3,445,049 and 3,266,390 and in Heisler et al. U.S. Pat. No. 3,262,628.

In Moore U.S. Pat. No. 2,823,826 a drum shell is formed of plural wall sections of fiberglass composition. Adjacent wall sections include interleaved margin portions which are interlocked by a common pin member. The shell interior is lined with impervious material to render it leakproof.

A further drum, in present commercial use and known as the "Greif Plastic Drum", produced by Grief Bros. Corporation, is comprised of a plastic body or shell with plastic closure members secured to the ends of the shell, however, by steel reinforcing chimes which encircle the shell ends and are crimped over the closure members. The top closure member has a dome-shaped central part continuous with a peripheral part which is engaged circumferentially by the upper reinforcing chime with spaced radially extending ribs connecting the central and peripheral parts to provide added strength for stacking and holding contents.

In making containers of exclusive plastic composition, various blow molding practices are known wherein an extruded parison is blown to conform to a mold cavity to provide a one-piece container. Unitarily molded shells with integral or detachable bottom and/or top closure members are disclosed in various U.S. patents including Reynolds U.S. Pat. No. 3,827,595, Ainslee U.S. Pat. No. 3,370,737, Sears, Jr. et al. U.S. Pat. No. 3,357,593, Somme U.S. Pat. No. 3,115,281, Hoeffelman U.S. Pat. No. 3,424,343, Rowe U.S. Pat. No. 3,826,404, Uemura U.S. Pat. No. 3,405,439 and Nughes U.S. Pat. No. 3,524,568. Whiteford U.S. Pat. No. 3,184,524 discloses a further alternative wherein a preform is peripherally clamped and centrally pressed into desired form defined by a mold.

The manufacture of plastic containers by processing molding material within forming dies has the evident disadvantage of rendering the production of different-sized containers quite costly. Thus, molds of diverse length and volume are required for making each uniquely sized container. Waste also occurs since container thickness is not uniformly maintainable in molding practices, i.e., containers are unnecessarily thick-walled in corner and like areas. Manufacture of containers by other obove-discussed techniques is complicated by the need for forming fibrous shells by winding and sealing laminates or joining sections and then applying a sealing lining thereto. Regarding the reference commercially-available drum, the same is a metal-reinforced plastic drum and its manufacture further entails the need for reinforcing its closure member by radial ribs as above considered.

SUMMARY OF THE INVENTION

An object of the present invention is to provide improved plastic containers suited for storage of corrosive materials.

A further object of the invention is to provide improved methods for the manufacture of containers impervious to materials storable therein.

In attaining the above and other objects, the invention provides in one aspect thereof a container having an axially extending plastic shell having at least one open end and a deformable closure member for closing such open end. The closure member has a first (hinge) portion in one axially extending part encircling and sealably secured to the outer surface of the shell adjacent such open end and in other part extending to end locations radially interiorly of and coaxial with the shell. A second (central) portion of the closure member is continuous with the first portion exclusively at such end locations thereof and is thereby hingeably supported by the first portion. The closure member second portion is axially bowed whereby it has linewise surface extent between diametrically opposed first portion end locations in excess of the diametric spacing between such end locations. By this arrangement, the closure member portions are unfolding or otherwise deformable on drop testing of the container to an extent maintaining the sealable relation of the closure member and shell. Containers according with the invention may incorporate shells which are extruded in sheet or tube form and thus have opposed open ends. Alternatively, the shell may be formed with one open end.

In a further aspect, the invention provides for joinder of a container closure member to the exterior of a container shell in a manner minimizing constraints on movement of the closure member hinge portion whereby the above-discussed excess linewise surface extent of the closure member central portion can be omitted in certain applications. The invention further provides improved bonding apparatus for effecting such joinder of the closure member and shell.

In making containers from extruded sheets, the invention defines a preferred method wherein plastic sheet material is cut into a sheet of length equal to desired shell axial length or height and of width approximating the shell circumference. The sheet is next formed into a hollow cylinder with the cut ends of the sheet defining the cylinder ends and with a longitudinal slit extending axially of the cylinder and defined by the sheet side edges. Bonding material is preferably applied to the slit and processed to provide a continuous impervious seal whereby the shell is completed. Top and bottom closure members of above-discussed character are then secured to the shell ends.

The foregoing and other objects and features of the invention will be evident from the following detailed discussion of preferred embodiments thereof and from the drawings wherein like reference numerals identify like parts throughout.

DESCRIPTION OF THE DRAWINGS

FIG. 3 is a frontal elevation in section of the completed FIG. 2 shell with end closure members therefor.

FIG. 3a illustrates an alternate end closure member configuration for use with the FIG. 2 shell.

FIG. 4 is a bottom plan view of the FIG. 3 embodiment.

DESCRIPTION OF THE PREFERRED EMBODIMENTS

Figure 1:
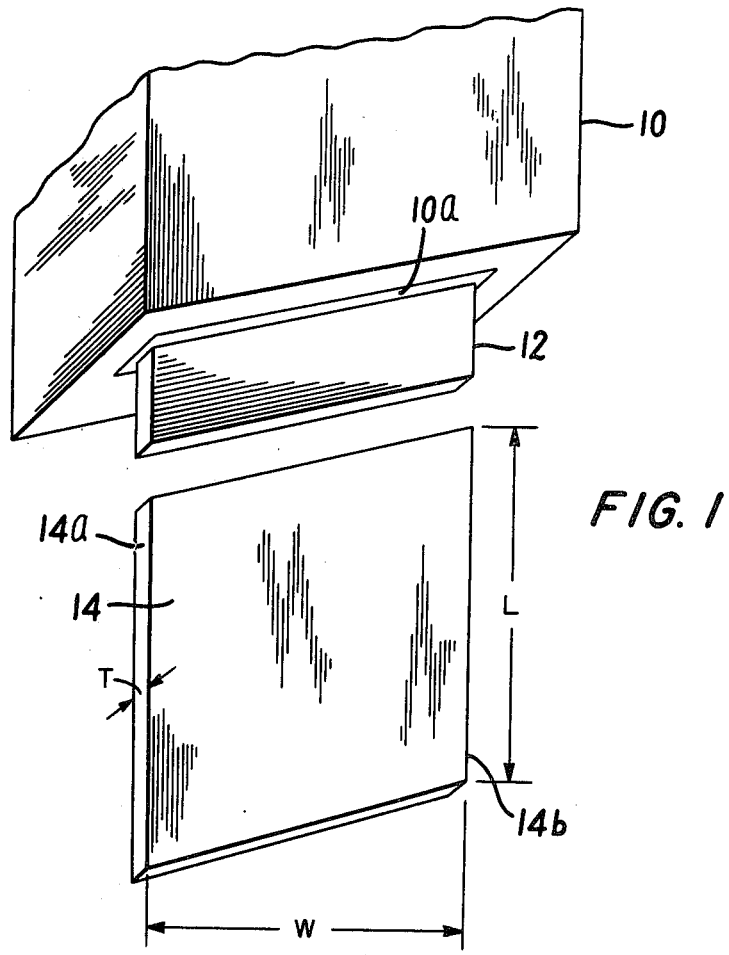
FIG. 1 illustrates schematically the extruding and cutting of shell-forming sheet material.
Figures 2, 2A:
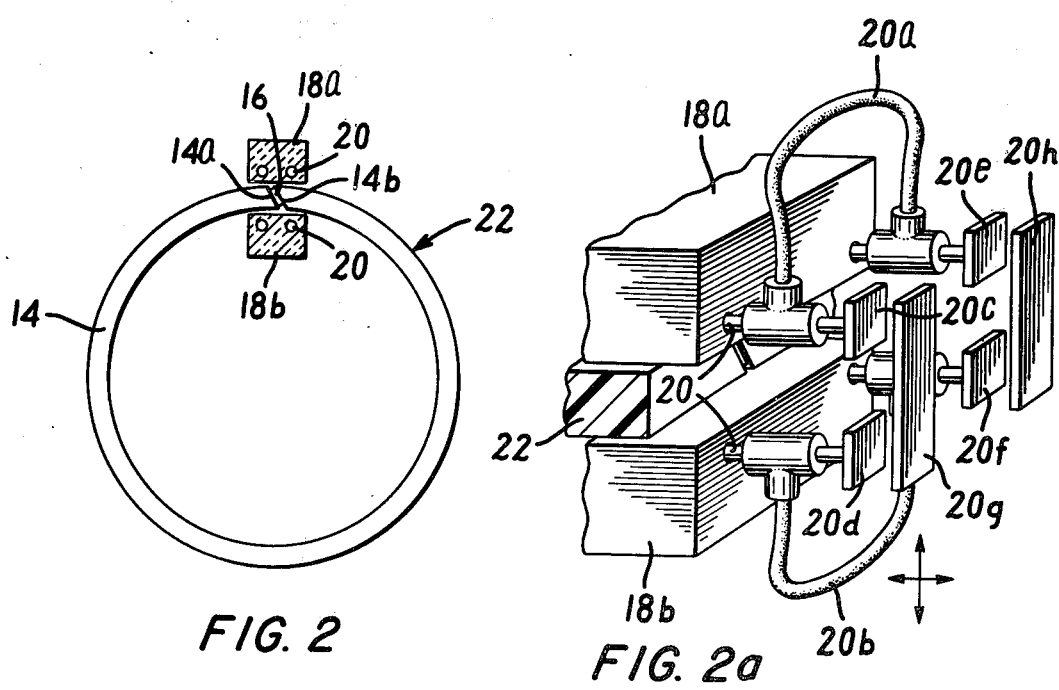
FIG. 2 is a top plan view of the FIG. 1 sheet material formed into a hollow shell with a strip of bonding material disposed in the shell axial seam and subject to the action of fusing apparatus illustrated in section.
FIG. 2a is a perspective view showing a manner of energizing the FIG. 2 fusing apparatus.

Referring to FIG. 1, extruder head 10 dispenses from die lip slit opening 10a continuous sheet material 12 preferably comprised of high molecular weight high density polyethylene. Cutting apparatus (not shown) selectively cuts sheet material 12 transversely of its issuing direction to form individual sheets 14 having length L and width W. The former of these dimensions is controlled by the cutting apparatus whereas the latter dimension may be varied together with sheet thickness T by substitution of extruder heads or changing the die lip opening. Opposed side edges 14a and 14b of sheet 14 are mitered at an angle of from five to forty-five degrees (FIG.2) and the sheet is then formed into a hollow cylinder. As shown in FIG. 2, mitered edges 14a and 14b are spaced slightly from one another and a strip of bonding material 16 is disposed therebetween. Strip 16 is preferably comprised of magnetizable particles, such as iron oxide, dispersed in a plastic base. With strip 16 and sheet 14 disposed as indicated in FIG. 2, holding fixtures 18a and 18b, both comprised of electrically insulative material, are clamped in pressure relation to one another. These fixtures support a continuous two-loop coil of axially extending hollow copper tubing 20 which is internally cooled and excited electrically by connection to a radio frequency supply whereby edges 14a and 14b of sheet 14 are fused together, applied pressure causing the bonding agent to flow into intimate contact with the facing surfaces of the sheet edges.

Rubber hose 20a (FIG. 2a) conducts coolant (water) from the right hand tubing 20 in fixture 18a to the left hand tubing 20 in fixture 18a. At the remote end of such left hand fixture 18a, the copper tubing conducts coolant and current therefrom to the right hand tubing 20 in fixture 18b. Rubber hose 20b conducts coolant thence to the left hand tubing 20 in fixture 18b. Switch plates 20g and 20h are movable horizontally in FIG. 2a to engage switch plates 20c–20f to energize the tubing. On completion of the fusing operation, plates 20g and 20h are moved vertically to permit axial removal of the bonded shell.

Figure 5:
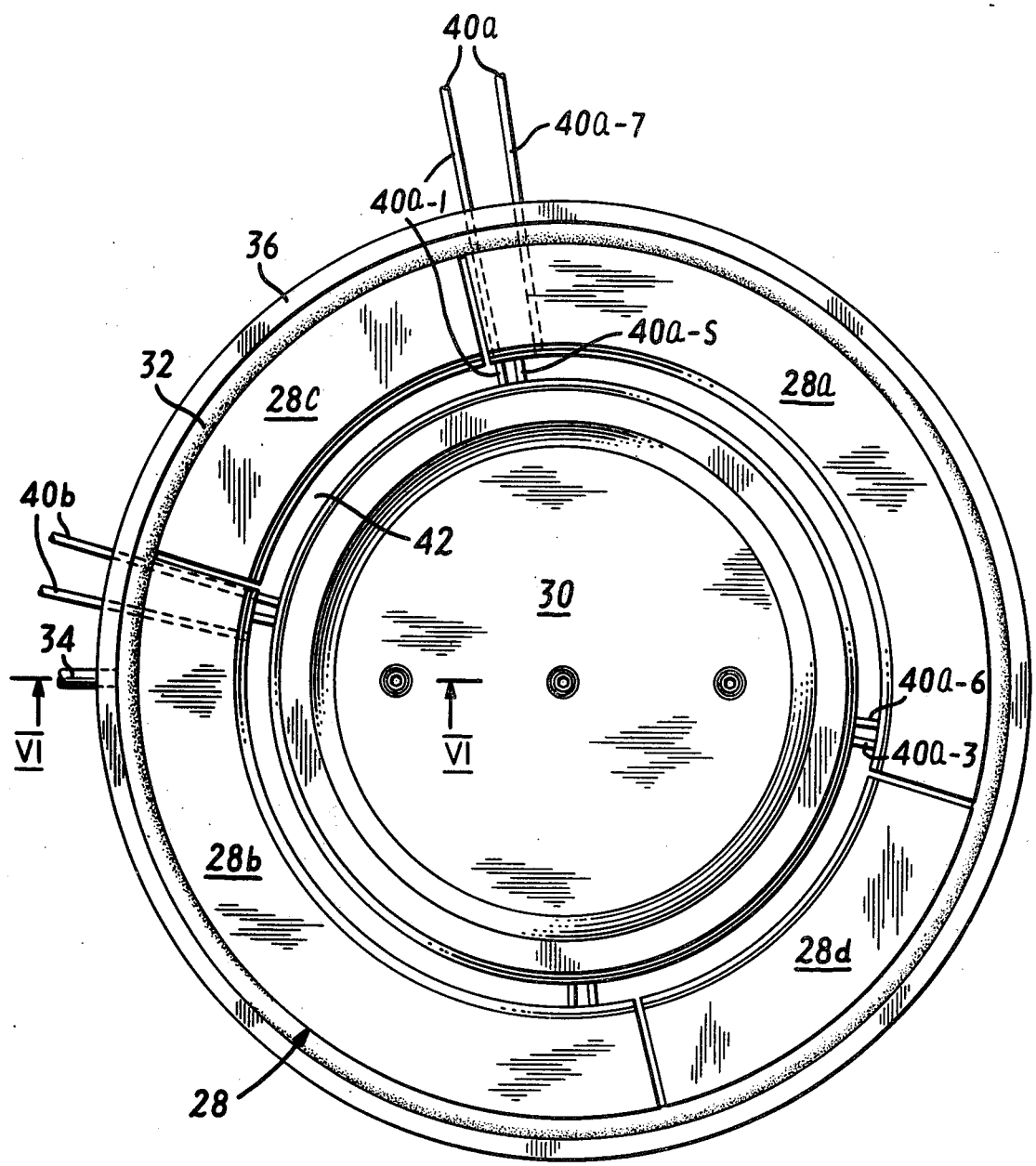
FIG. 5 is a top plan view of fusing apparatus for use in securing the FIG. 3 end closure members to the shell.
Figure 5A:
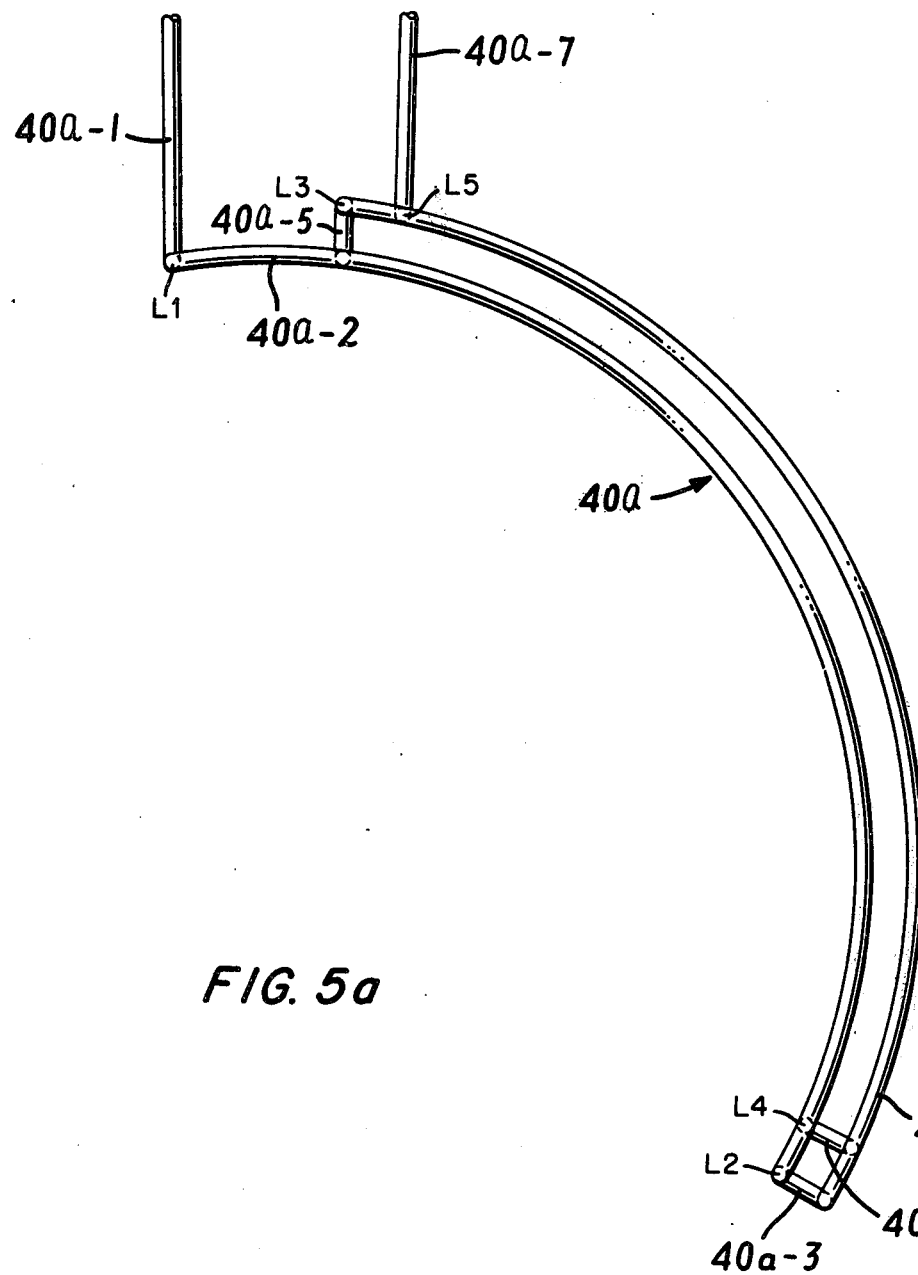
FIG. 5a shows tube 40a of the FIG. 5 fusing apparatus removed therefrom.
Figure 6:
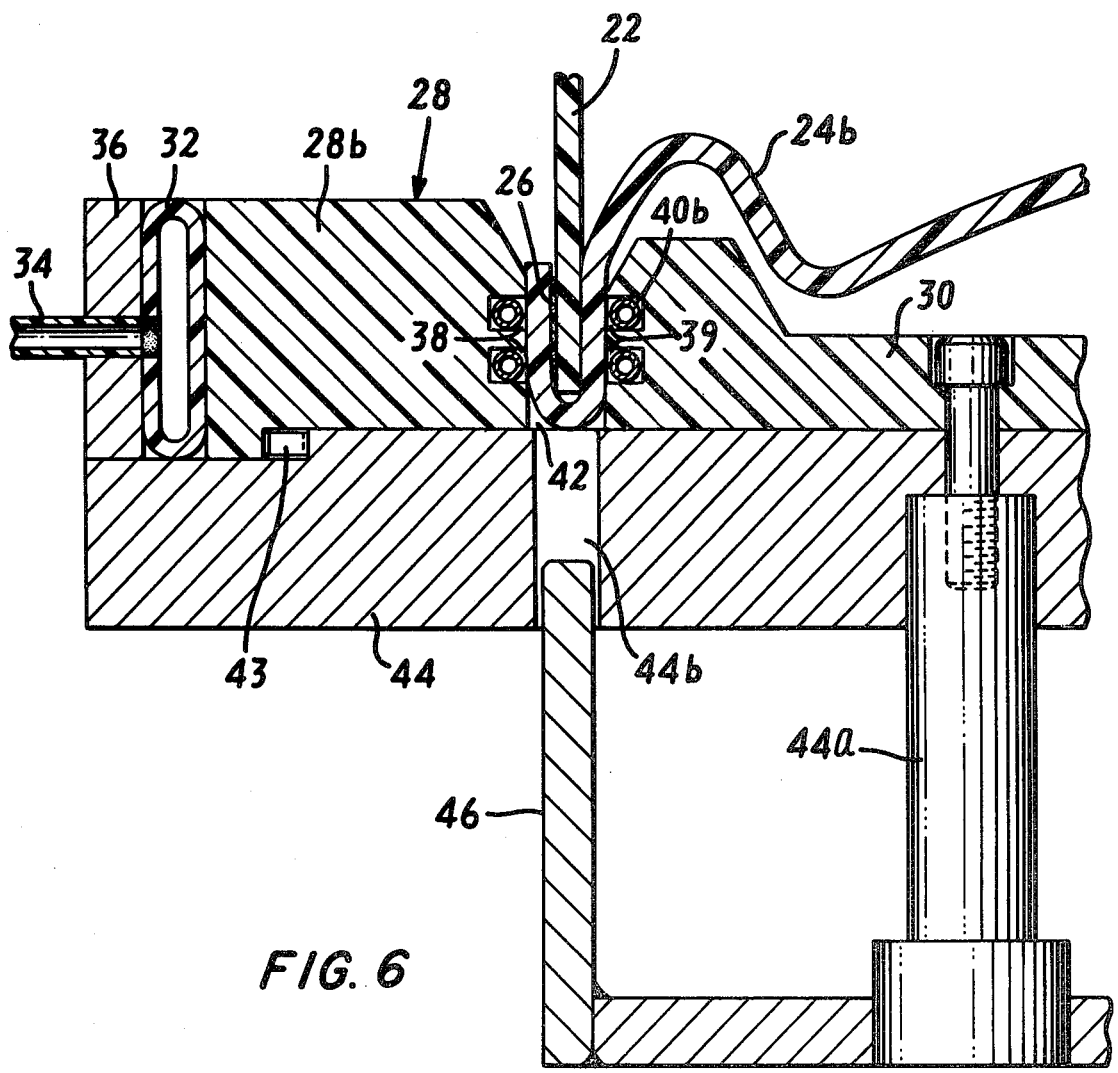
FIG. 6 is an enlarged sectional view of the FIG. 5 apparatus as seen from the line VI—VI of FIG. 5 operative in a fusing operation.

Referring to FIG. 3, the above-discussed seaming operation provides a completed container shell 22 having axially extending seam 22a. End closure members 24a and 24b, formed in configuration shown in FIG. 3 and preferably of like material to that of shell 22, are disposed in place on the ends of shell 22 with strips 26 of bonding material situated interiorly of the end closure members and exteriorly of shell 22 as illustated. With shell 22, members 24a and 24b and strips 26 so arranged, the member 24b end of the assembly is placed in bonding apparatus as shown in FIG. 6. This apparatus has an outer fixture 28 (FIG. 5) supported in spaced radially encircling relation to an inner fixture 30, both comprised of electrically insulative material. Fixture 28 is of segmented type, including segments 28a and 28b each spanning approximately one hundred-twenty degrees and segments 28c and 28d, each spanning approximately sixty degrees. The radially outward surfaces of segments 28a–28d engage bladder 32 serviced on demand from a supply of pressurized air through conduit 34 for displacing the segments radially inwardly. Rigid outer ring 36 provides a reaction bearing surface for bladder 32. At their radially interior surfaces, segments 28a and 28b define grooves 38 (FIG. 5) and fixture 30 defines grooves 39 for receiving double loop hollow copper tubes 40a and 40b (FIGS. 5, 5a). Tubes 40a and 40b are used, as in the case of tubing 20 above-discussed for applying a radio frequency induction field to unbonded assemblies disposed in channel 42 established between segments 28a–28d and fixture 30.

The manner in which the tubing is routed in the FIG. 5 apparatus is seen in FIG. 5a which shows tube 40a removed from the FIG. 5 apparatus. Tube 40a portion 40a-1 extends into fixture 30 to location L1 and the tubing then proceeds outwardly toward the viewer of FIG. 5a to tube portion 40a-2 which extends in an upper groove of fixture 30 clockwise circularly to location L2. At this location, tube 40a proceeds inwardly away from the viewer of FIG. 5a to tube portion 40a-3 which extends radially outwardly to segment 28a and thence to an upper groove in segment 28a. Tube portion 40a-4 proceeds counterclockwise circularly in such segment 28a groove to location L3 and then proceeds inwardly away from the FIG. 5a viewer to tube portion 40a-5 which proceeds radially inwardly of segment 28a to a lower groove of fixture 30. Thereupon tube 40a extends clockwise circularly in fixture 30 to location L4 whereupon tube portion 40a-6 proceeds radially outwardly to a lower groove of segment 28a and therein to location L5. At this location tube portion 40a-7 extends radially outwardly of segment 28a. Fixture 30 and segment 28a have grooves at locations L1-L4 and elsewhere running transverse of and interconnecting their upper and lower grooves to provide for travel of tube 40a between such upper and lower grooves.

With the unbonded assembly of bonded shell 22, closure member 24b and strip 26 disposed in channel 42 (FIG. 6), conduit 34 is positively pressurized and segments 28a–28d press the assembly against fixture 30. Segments 28c and 28d serve to equalize pressure around the circumference of the unbonded assembly. Tubes 40a and 40b are energized whereby the part of the assembly adjacent the tubes is fused together, the applied pressure causing the bonding agent to flow into intimate contact with the surfaces of shell 22 and end closure member 24b which face strip 26.

In the embodiment shown in FIGS. 5, 5a and 6, tubes 40a and 40b each encompass approximately one hundred degrees of arc, mutually spaced by some ninety degrees. For a complete bonding operation, the work is rotated and two passes are needed. The invention of course contemplates a single continuous double loop tubing assembly whereby the bonding operation may be completed in a single pass mode for joining each closure member to the bonded shell.

Leaf spring 43 between base 44 and the segments urges the segments radially outwardly of channel 42 when bladder 32 is deflated to facilitate removal of bonded assemblies. For automated removal of bonded assemblies from the bonding apparatus, ram assembly 46 is slidably supported on sleeve 44a of the base 44 for movement through base opening 44b into channel 42.

Referring to FIGS. 3 and 4, end closure members 24a and 24b include a first (hinge) portion 24-1 having one part 24-1a extending axially of shell 22 and encircling the outer surface of the shell and another part 24-1b extending to end locations radially interiorly of and coaxial with the shell, i.e., as defined by circular locus 24-1c shown in broken lines. The closure members have a second (central) portion 24-2 continuous with portion 24-1 exclusively at such end locations in circle 24-1c whereby portion 24-2 is hingeably supported by portion 24-1. Portion 24-2 is itself preferably bowed axially of shell 22 such that it has linewise surface extent $S_1$ between diametrically opposed ones, e.g. $L_A$ and $L_B$, of end locations of portion 24-1 in excess of the diametric spacing $S_2$ between such end locations. Closure member 24a may have bung hole fittings, one being shown at 24c in FIG. 3.

By this arrangement, portions 24-1 and 24-2 are deformable or unfolding to a preselected degree upon subjecting the FIG. 3 container to drop testing, the extent of unfolding thereof being greater when portion 24-2 is bowed axially of the shell. As considered in the examples below, the sealable relation of the closure members and the shell is thereby maintained throughout such testing. While portion 24-2 is bowed axially inwardly of shell 22 or dished in FIG. 3, the closure members may also have the configuration shown in FIG. 3a, i.e., with portion 24-2' bowed axially outwardly of the shell or domed. In the FIG. 3a arrangement the linewise surface extent $S_3$ of portion 24-2' between diametrically opposed end locations of hinge portion 24-1' exceeds the diametric spacing $S_2$ between end locations. As will be appreciated, the closure member hinge and central portions are preferably parts of an integral plastic structure formed by a molding operation.

EXAMPLE 1

The side edges of an extruded sheet of high molecular weight high density polyethylene (HDPE), 38 inches in width, 70.5 inches in length and 0.135 inch in thickness are mitered at an angle of 10° and the sheet is formed into a cylindrical shell as in FIG. 2 having a diameter of 22.5 inches and an axially extending slit between the mitered edges. A strip of bonding material comprised of HDPE containing iron oxide particles and having a thickness of 0.015 inch and a width of 0.625 inch is placed in the slit and extends throughout the slit length. Bonding fixtures are next pressed against the shell slit as in FIG. 2 and are energized from a radio-frequency supply to subject the bonding material to an electromagnetic field, heating the material to its fusion point and flowing the material into intimate contact with the mitered edges, thus sealing the shell slit throughout its length.

End closure members are molded of high molecular weight HDPE in the configuration shown in FIG. 3 and have an average thickness of 0.187 inch. The line surface extent of the end closure members ($S_1$ in FIG. 3) is four percent longer than the spacing ($S_2$ in FIG. 3) between diametrically opposed end locations of the hinge portion. The end closure members are assembled with the shell and with a bonding material strip therebetween as in FIG. 3, comprised of HDPE containing iron oxide particles and having a thickness of 0.015 inch and a width of 0.750 inch. Bonding fixtures are next pressed against the assembly as in FIG. 6 and are energized from a radio-frequency supply to subject the bonding material to an electromagnetic field, heating the material to its fusion point and flowing the material into intimate contact with the surfaces of the end closure members and shell facing the material.

Containers so formed and with bungs threaded into bung holes in one of the end closure members are subjected to internal hydrostatic pressure of 15 psi. No fluid leakage is observed on inspection. Containers so formed are filled through the bung holes with 55 gallons of water and water-methanol mixtures. Bungs are threaded into the bung holes and the containers are dropped from a height of 4 feet at an angle of 45° with respect to the container longitudinal axis at temperatures of 70° F. and 0° F. No fluid leakage is observed on inspection of the dropped containers.

EXAMPLE 2

End closure members are molded of high molecular weight HDPE in the configuration shown in FIG. 3a with average thickness of 0.187 inch and line surface extent ($S_3$ in FIG. 3a) four percent longer than the spacing ($S_2$) between diametrically opposed end locations of the hinge portion. End closure members so formed are secured to shells formed as in Example 1 in the manner set forth in Example 1. The resulting containers are subjected to the internal hydrostatic pressure and drop testing set forth in Example 1 without showing fluid leakage.

EXAMPLE 3

The side edges of an extruded sheet of high molecular weight HDPE, 13.5 inches in width, 36.5 inches in length and 0.085 inch in thickness are mitered at an angle of 10° and the sheet is formed into a cylindrical shell as in FIG. 2 having a diameter of 11.5 inches and an axially extending slit between the mitered edges. A strip of bonding material comprised of HDPE containing iron oxide particles and having a thickness of 0.010 inch and a width of 0.375 inch is placed in the slit and extends throughout the slit length. The shell slit is sealed throughout its length in the manner set forth in Example 1.

End closure members are molded of high molecular weight HDPE in the configuration shown in FIG. 3 and have an average thickness of 0.085 inch. The line surface extent of the end closure members ($S_1$ in FIG. 3) is two percent longer than the spacing ($S_2$ in FIG. 3) between diametrically opposed end locations of the hinge portion. The end closure members are assembled with the shell and with a bonding material strip therebetween as in FIG. 3 comprised of HDPE containing iron oxide particles and having a thickness of 0.010 inch and a width of 0.5 inch. The assembly is secured in the manner set forth in Example 1.

Containers so formed and with a bung threaded into a bung hole in one of the end closure members are subjected to internal hydrostatic pressure of 15 psi. No fluid leakage is observed on inspection. Containers so formed are filled through the bung hole with 5 gallons of water and water-methanol mixtures. A bung is threaded into the bung hole and the containers are dropped from a height of 4 feet at an angle of 45° with respect to the container longitudinal axis at temperatures of 70° F. and 0° F. No fluid leakage is observed on inspection of the dropped containers.

EXAMPLE 4

A high molecular weight HDPE shell is extruded in cylindrical form through a circular die slot opening. The shell is 13.5 inches in length, having a diameter of 11.5 inches and 0.085 inch in thickness. End closure members with an average thickness of 0.085 inch are molded of high molecular weight HDPE in the configuration of FIG. 3 except that their line surface extents ($S_1$ in FIG. 3) are equal to the spacings ($S_2$) between diametrically opposed end locations of the hinge portions, i.e., central portion 24-2 is flat. End closure members so formed are secured to the shell in the manner set forth in Example 1. The resulting containers are subjected to the internal hydrostatic pressure and drop testing set forth in Example 3 without showing fluid leakage.

EXAMPLE 5

A single end closure member of 0.085 inch average thickness is molded of high molecular weight HDPE in the configuration of FIG. 3 except that their line surface extents ($S_3$ in FIG. 3) are equal to the spacings ($S_2$) between diametrically opposed end locations of the hinge portion, i.e., central portion 24-2 is flat. The end closure member is secured to a HDPE injection molded one-piece pail having a height of 13.5 inches, a diameter of 11.5 inches and 0.085 inch in average thickness, using the bonding method set forth in Example 1. The resulting containers are subjected to the internal hydrostatic pressure and drop testing as set forth in Example 3 without showing fluid leakage.

While the invention has been disclosed by way of particularly preferred embodiments, various changes and modifications thereof will be evident to those skilled in the container, bonding and related arts. Where in extruded sheet form, the shell axial slit need not have mitered edges nor strip bonding material disposed therein, but may have non-mitered edges joined directly to one another by fusion or like techniques or by use of a common backing member joined thereto. The particularly disclosed embodiments are thus intended in an illustrative and not in a limiting sense, the true spirit and scope of the invention being set forth in the following claims.

What is claimed is:

1. In apparatus for use in securing a closure member to an open end of a shell including a first fixture and a second fixture supported coaxially interiorly of said first fixture, said fixtures being supported for relative movement to jointly define a radially extending space therebetween for receiving an unbonded assembly of said closure member and said shell, at least one of said fixtures being comprised of separate segments, first means for displacing said fixtures relative to one another whereby said fixtures apply pressure to said assembly, and second means for subjecting such pressed assembly to heat energy, the improvement wherein said second means comprises an electromagnetic field generator supported at the pressing periphery of at least one of said fixtures immediate to the pressed assembly and adapted for flexure relative to its supporting fixture and bonding material including magnetizable particles dispersed in plastic, said particles being responsive to such generated electromagnetic field to heat said plastic to its fusion point for flowing thereof into intimate contact with surfaces of said shell and said closure member in facing relation to said bonding material.

2. The apparatus claimed in claim 1 wherein said first fixture is segmented and wherein said first means comprises inflatable means situated radially inwardly of and engageable with said segments and rigid means disposed radially outwardly of said inflatable means for defining a bearing reaction surface for said inflatable means.

3. The apparatus claimed in claim 1 wherein said second means comprises radio-frequency energizable tubing means supported by at least one of said fixtures and defining an interior hollow for receiving a cooling medium.

4. The apparatus claimed in claim 1 wherein said second means comprises radio-frequency energizable tubing means supported by at least one of said fixtures and of extent less than the perimeter of said assembly and thereby adapted for said flexure relative to its supporting fixture for movement into confronting relation with said assembly in the course of pressing thereof.

* * * * *